United States Patent
Wentworth

[11] 3,970,604
[45] July 20, 1976

[54] METHOD FOR RECOVERING VINYL SULFONATE MONOMERS

[75] Inventor: Gary Wentworth, Raleigh, N.C.

[73] Assignee: Monsanto Company, St. Louis, Mo.

[22] Filed: Dec. 18, 1974

[21] Appl. No.: 533,898

[52] U.S. Cl. .............................. 260/79.3 M; 210/40; 260/29.6 AN; 260/29.6 SQ; 260/79.5 R; 260/708; 526/68; 526/342

[51] Int. Cl.$^2$ ................... B01D 15/00; B01D 53/14; C08F 28/02; C08L 33/20

[58] Field of Search ....... 260/79.5 R, 708, 29.6 AN, 260/29.6 SQ, 79.3 M; 210/40

[56] References Cited
UNITED STATES PATENTS

| | | | |
|---|---|---|---|
| 2,696,304 | 12/1954 | Gilmore | 260/708 |
| 2,696,510 | 12/1954 | Weedman | 260/708 |
| 3,005,826 | 10/1961 | Fleck et al. | 260/708 |
| 3,295,689 | 1/1967 | Arvanitakis | 210/40 |
| 3,370,002 | 2/1968 | Cottle | 260/708 |
| 3,547,899 | 12/1970 | Arlt et al. | 260/79.3 MU |

OTHER PUBLICATIONS

Chemical Abstracts, vol. 67, No. 20, 11/13/1967, p. 94, 304K.
Chemical Abstracts, vol. 72, No. 18, 5/4/1970, p. 93, 624 F.
Chemical Abstracts, vol. 73, No. 4, 7/27/1970, p. 16, 616Y.
Chemical Abstracts, vol. 74, No. 14, 4/5/1971, p. 68, 116A.
Chemical Abstracts, 8th Collective Index, 1972, p. 6, 423 S.

Primary Examiner—Ronald W. Griffin
Attorney, Agent, or Firm—Robert L. Broad, Jr.

[57] ABSTRACT

Vinyl sulfonate monomers are recovered from an aqueous stream by bringing the stream into contact with activated carbon to allow the carbon to adsorb the monomers from the stream. The sulfonate monomers are subsequently removed from the carbon by bringing an aqueous solution of acrylonitrile into contact with the carbon. The acrylonitrile replaces the sulfonate monomers on the carbon to thereby desorb the sulfonate monomers into the solution in a concentration such that the solution is suitable as a feed stream to a polymerization reactor. The sulfonate monomers have the formula

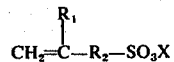

where $R_1$ is —H or —$CH_3$, $R_2$ is —$CH_2$— or

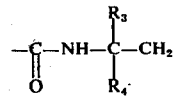

in which $R_3$ and $R_4$ are either —H or —$CH_3$ and X is H, Na or K.

6 Claims, No Drawings

METHOD FOR RECOVERING VINYL SULFONATE MONOMERS

BACKGROUND OF THE INVENTION a. Field of the Invention

This invention relates to methods for recovering certain vinyl sulfonate monomers.

b. Description of the Prior Art

It is well known to copolymerize various mono-olefinic monomers with acrylonitrile in making polymers from which textile filaments are spun. In the conventional process, unreacted monomers are recovered by a distillation process. Unfortunately, such a recovery process is not effective for unreacted monomers of the type

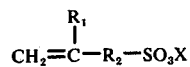

where $R_1$ is —H or —$CH_3$ and $R_2$ is —$CH_2$— or

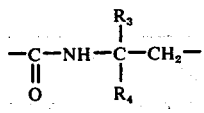

in which $R_3$ and $R_4$ are -H or -$CH_3$ and X is H, Na or K for the reason that these monomers are not sufficiently volatile.

Monomers of this type are not usually used as components of textile polymers except in small proportions. Because of the difficulty of recovering the unreacted portion of such monomers and the small amounts of such monomers used, the past practice has been to discard the stream containing these unreacted monomers. The disadvantage of this practice is that these monomers are expensive and only partially biodegradable.

It is known to use carbon for the adsorption of various substances. However, it is not believed that it is known to adsorb the sulfonate monomers of this invention on carbon and then desorb these monomers from the carbon by using acrylonitrile.

SUMMARY OF THE INVENTION

The process of this invention is suitable for recovering unreacted vinyl sulfonate monomers from slurries produced by the polymerization of acrylonitrile with vinyl sulfonate and other mono-olefinic monomers copolymerizable with acrylonitrile. Prior to treatment by this process the polymerization slurry is filtered to remove polymer solids. Unreacted monomers of a more volatile nature, such as acrylonitrile, vinylidene chloride, etc., are then stripped from the solids-free filtrate, although the order of these two processes may be reversed, i.e., volatile monomers may be stripped from the slurry before it is filtered.

The filtrate, free of volatile monomers and polymer solids, is then treated by the process of the present invention, which comprises passing the filtrate through a bed of activated carbon to remove the sulfonate monomers from the filtrate by adsorption on the carbon and subsequently washing the carbon containing the monomers with an aqueous washing solution containing about 0.1 to 8.0 weight percent acrylonitrile to desorb the sulfonate monomers from the carbon into the solution, leaving the solution with a sufficiently high concentration of sulfonate monomers that it can be used as a feed stream directly back to the polymerization reactor. The acrylonitrile remaining on the carbon after the desorbing step can be removed by steam stripping to renew the carbon.

The sulfonate monomers recoverable by the process of this invention have the formula

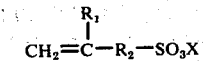

where $R_1$ is —H or —$CH_3$, $R_2$ is —$CH_2$— or

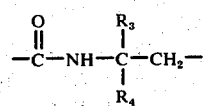

in which $R_3$ and $R_4$ are —H or —$CH_3$ and X is Na, H or K.

DESCRIPTION OF PREFERRED EMBODIMENTS

This invention provides a process for recovering unreacted sulfonate monomers of the type

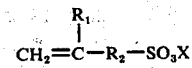

where $R_1$ is —H or —$CH_3$ and $R_2$ is —$CH_2$— or

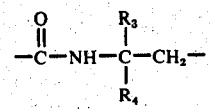

in which $R_3$ and $R_4$ are —H or —$CH_3$ and X is Na, H or K, from slurries resulting from the polymerization of acrylonitrile with these and other mono-olefinic monomers. Sulfonate monomers of particular interest are 2-acrylamido-2-methylpropane sulfonic acid (AMPS), sodium 2-acrylamido-2-methyl propane sulfonate (SAMPS) and potassium 2-acrylamido-2-methylpropane sulfonate.

The polymerization slurry is passed through a filter to remove polymer solids formed during the polymerization and to leave a filtrate containing the unreacted sulfonate monomers, as well as small percentages of other unreacted monomers such as vinyl acetate, vinyl chloride, vinylidene chloride, vinyl bromide and other mono-olefinic monomers. Other mono-olefinic monomers copolymerizable with acrylonitrile are well known. Usually, these other unreacted monomers have a volatility such that they, as well as the unreacted acrylonitrile monomers, can easily be stripped from the filtrate in a known manner.

Either before or after filtration of the slurry, the volatile unreacted monomers, such as acrylonitrile, are removed by distillation. This will leave an aqueous solution containing 0.005 to 1.0 weight percent of the unreacted sulfonate monomers. In a typical process the amount will be about 0.1 weight percent. The solution will also contain small amounts of inorganic materials such as leftover activator or catalyst or other special additives. In general, these inorganic materials have no effect on the process of the present invention.

After filtration and distillation the solution is passed through a first bed of activated carbon which adsorbs the sulfonate monomers from the solution. The contact time between the solution containing the sulfonate monomer or monomers and the activated carbon should be at least 1 minute and is preferably in the range of 8 to 15 minutes. The inorganic materials pass through the charcoal and are discarded with the stream leaving the carbon.

The solution is fed to the carbon until the carbon ceases to efficiently adsorb the sulfonate monomers. In practice, this point is reached when the weight ratio of carbon to adsorbed sulfonate monomer reaches the range of about 50 to about 3.

A second bed of carbon, in series with the first, is used to prevent loss of any sulfonate monomer which is not adsorbed by the first bed. In practice, three carbon beds will be used, with the beds being so arranged that any two of the beds can be connected in series for adsorbing sulfonate monomers while the third bed is being taken through the washing and carbon renewal stages described below.

The sulfonate monomers are removed from the carbon by washing the carbon with aqueous acrylonitrile passed through the carbon. These monomers can also be removed from the carbon by use of aqueous solutions of other organic compounds such as acetone or ethanol, but these agents are not nearly as effective as acrylonitrile. The desorption rate is dependent on the acrylonitrile concentration in the washing solution and increases with acrylonitrile concentration. The amount of acrylonitrile used in the washing solution should be about 0.1 to 8.0 percent, based on solution weight, although it has been demonstrated that inhomogeneous mixtures containing higher proportions of acrylonitrile in water are effective. The inhomogeneous mixture will be made up of an aqueous solution of about 8 weight percent acrylonitrile mixed with the excess acrylonitrile in a separate phase. The washing solution should be in contact with the carbon for a time period of 1 to 60 minutes, preferably 2 to 15 minutes.

The sulfonate monomer on the carbon is replaced by acrylonitrile during the washing or desorption process. The washing stream leaving the carbon bed will contain 0.5 to 5.0 weight percent of the sulfonate monomer. Preferably, the washing stream leaving the carbon bed will contain at least about 1.5 weight percent of the sulfonate monomers, a concentration which is suitable for direct feed back to a polymerization reactor.

After the sulfonate monomers have been replaced by acrylonitrile in the carbon, steam is passed through the carbon to strip the acrylonitrile therefrom and thereby renew the carbon for again adsorbing sulfonate monomers.

In the following examples acrylonitrile, acetone and ethanol were determined by gas chromatography.

EXAMPLE I 100 ml portions of an aqueous solution of sodium 2-acrylamido-2-methylpropane sulfonate (SAMPS), 2.13 grams SAMPS per liter, containing various quantities of activated carbon were stirred for one hour. Analysis of the treated solutions showed the effect of quantity of carbon on adsorption efficiency.

| Quantity of carbon, g | SAMPS concentration, g/l |
|---|---|
| 0 | 2.13 |
| 0.5 | 1.88 |
| 1.0 | 1.61 |
| 2.5 | 1.04 |
| 7.5 | 0.15 |

EXAMPLE II 100 ml portions of an aqueous solution of SAMPS, 2.13 grams SAMPS per liter, each containing 5.0 gram of activated carbon were stirred for varying periods of time. Analysis of the treated solutions showed the effect of contact time on adsorption efficiency.

| Contact time, min. | SAMPS concentration, g/l |
|---|---|
| 0 | 2.13 |
| 10 | 1.02 |
| 20 | 0.82 |
| 30 | 0.68 |
| 60 | 0.48 |
| 90 | 0.41 |

EXAMPLE III

A column 5 cm in diameter was packed with 871 g of activated carbon (12 mesh). An aqueous solution of SAMPS (4.65 g/l) was passed upward through the column at a rate of 33.0 cc/min. Effluent from the column was collected and analyzed periodically for SAMPS.

| Total Effluent volume, l | SAMPS concentration, g/l |
|---|---|
| 6.60 | 0 |
| 7.92 | 0.14 |
| 9.24 | 0.99 |
| 10.56 | 2.08 |
| 11.88 | 3.00 |
| 13.20 | 3.71 |
| 14.52 | 4.15 |

The quantity of SAMPS adsorbed on the carbon column at the end of the run was calculated to be 49.0 g. Aqueous acrylonitrile (7.0 weight percent) was then passed upward through the column at a rate of 33.0 cc/min. Effluent from the column was collected and analyzed periodically for SAMPS and acrylonitrile.

| Total Effluent volume, l | Total SAMPS grams desorbed | Total AN grams adsorbed |
|---|---|---|
| 1.0 | 3.96 | 62.0 |
| 2.0 | 9.31 | 124.0 |
| 3.0 | 20.44 | 186.0 |
| 4.0 | 37.45 | 246.5 |
| 5.0 | 45.82 | 276.5 |
| 6.0 | 46.93 | 281.5 |
| 7.0 | 47.18 | |
| 8.0 | 47.26 | |
| 9.0 | 47.33 | |
| 10.0 | 47.38 | |
| 11.0 | 47.44 | |
| 12.0 | 47.52 | 281.5 |

Thus, 47.5/49.0, or 97 percent of the SAMPS was desorbed by 281 g of AN.

The column was then treated with steam 1.6 – 1.74 kg/cm² absolute (8 – 10 psig) to remove acrylonitrile from the carbon so that the carbon could again be used for adsorbing sulfonate monomers. Analysis of the distillate from the column showed that AN removal was quantitative.

What is claimed is:

1. A method of recovering from an aqueous process solution sulfonate monomers having the formula

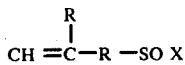

where R is —H or —CH, R is —CH — or

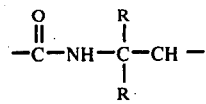

in which R and R are —H or —CH, and X is Na, H or K comprising
 a. bringing the aqueous solution into contact with activated carbon to adsorb the sulfonate monomers from the solution into the carbon, said solution being in contact with the carbon for a time period of about 1 to 15 minutes,
 b. removing the carbon from the solution, and
 c. washing the carbon with an aqueous washing solution of 0.1 to 8.0 weight percent acrylonitrile to desorb the sulfonate monomers from the carbon into the washing solution to give a solution concentration of about 0.5 to 5.0 weight percent of said sulfonate monomers.

2. The process of claim 1 wherein the process solution is brought into contact with the carbon by passing said process solution through a bed of activated carbon, the solution being passed through the carbon at such a rate that the solution is in contact with the carbon for a time period of 1 to 15 minutes.

3. The method of claim 2 wherein the aqueous process solution is passed through the carbon bed until the weight ratio of carbon to adsorbed sulfonate monomer is in the range of about 50 to about 3.

4. The method of recovering unreacted sulfonate monomers from slurries produced by the polymerization of acrylonitrile with said sulfonate monomers and other mono-olefinic monomers copolymerizable with acrylonitrile, said sulfonate monomers having the formula

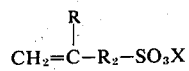

where $R_1$ is —H or —$CH_3$, $R_2$ is —$CH_2$ or

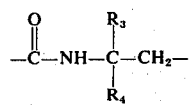

in which $R_3$ and $R_4$ are —H or —$CH_3$, and X is Na, H or K comprising
 a. filtering the slurry to remove polymer solids therefrom to leave a filtrate containing about 0.01 to 1.0 weight percent of said sulfonate monomers,
 b. removing said other mono-olefinic monomers from said filtrate,
 c. passing the filtrate through activated carbon to remove said sulfonate monomers from the filtrate by adsorption by said carbon, and
 d. washing the carbon with an aqueous washing solution containing about 0.1 to 8.0 weight percent acrylonitrile to desorb said sulfonate monomers from the carbon into said washing solution.

5. The method of claim 4 wherein the filtrate is in contact with the carbon for a time period of 1 to 15 minutes.

6. The method of claim 5 wherein the sulfonate monomers is selected from the group consisting of 2-acrylamido-2-methylpropane sulfonic acid, sodium 2-acrylamido-2-methylpropane sulfonate and potassium 2-acrylamido-2-methylpropane sulfonate.

* * * * *

UNITED STATES PATENT OFFICE
CERTIFICATE OF CORRECTION

PATENT NO. : 3,970,604
DATED : July 20, 1976
INVENTOR(S) : Gary Wentworth

It is certified that error appears in the above-identified patent and that said Letters Patent are hereby corrected as shown below:

Claim 1, first paragraph reads:

1. A method of recovering from an aqueous process solution sulfonate monomers having the formula

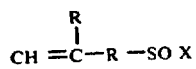

where R is —H or —CH, R is —CH — or

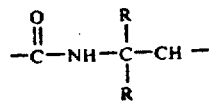

in which R and R are —H or —CH, and X is Na, H or K comprising should read:

1. A method of recovering from an aqueous process solution sulfonate monomers having the formula

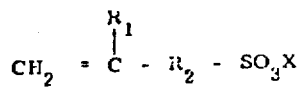

where $R_1$ is -H or -$CH_3$, $R_2$ is -$CH_2$- or

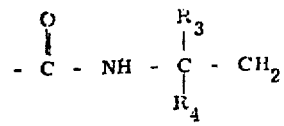

in which $R_3$ and $R_4$ are -H or -$CH_3$, and X is Na, H or K comprising

UNITED STATES PATENT OFFICE
CERTIFICATE OF CORRECTION

PATENT NO. : 3,970,604
DATED : July 20, 1976
INVENTOR(S) : Gary Wentworth

It is certified that error appears in the above-identified patent and that said Letters Patent are hereby corrected as shown below:

Claim 4, the formula reads:

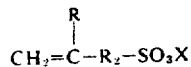

where $R_1$ is —H or —$CH_3$, $R_2$ is —$CH_2$ or

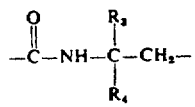

should read:

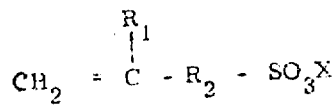

where $R_1$ is -H or -$CH_3$, $R_2$ is -$CH_2$ or

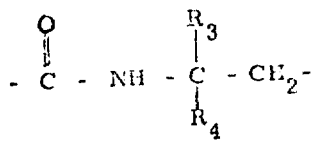

Signed and Sealed this

Ninth Day of November 1976

[SEAL]

Attest:

RUTH C. MASON
Attesting Officer

C. MARSHALL DANN
Commissioner of Patents and Trademarks